(12) United States Patent
Miskelly (10) Patent No.: US 8,972,997 B2
(45) Date of Patent: Mar. 3, 2015

(54) WORK ITEM PROCESSING IN DISTRIBUTED APPLICATIONS

(75) Inventor: Gregg Miskelly, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 718 days.

(21) Appl. No.: 13/163,289

(22) Filed: Jun. 17, 2011

(65) Prior Publication Data

US 2012/0324465 A1 Dec. 20, 2012

(51) Int. Cl.
*G06F 9/455* (2006.01)
*G06F 9/50* (2006.01)

(52) U.S. Cl.
CPC .................................. *G06F 9/5038* (2013.01)
USPC .......................... 718/100; 717/124; 717/129

(58) Field of Classification Search
None
See application file for complete search history.

(56) References Cited

U.S. PATENT DOCUMENTS

| | | | |
|---|---|---|---|
| 6,115,646 A | | 9/2000 | Fiszman et al. |
| 7,908,313 B2 | | 3/2011 | Lurie et al. |
| 8,056,079 B1 | * | 11/2011 | Martin et al. ................. 718/102 |
| 2005/0071443 A1 | * | 3/2005 | Menon et al. ................. 709/223 |
| 2007/0027968 A1 | * | 2/2007 | Price et al. .................... 709/220 |
| 2008/0022287 A1 | * | 1/2008 | Bril ............................... 718/107 |
| 2008/0163219 A1 | * | 7/2008 | Marwinski .................... 718/101 |
| 2008/0177525 A1 | * | 7/2008 | Crawford et al. ............... 703/22 |
| 2008/0209435 A1 | | 8/2008 | Dong et al. |
| 2008/0263106 A1 | | 10/2008 | Asherman et al. |

OTHER PUBLICATIONS

"ActiveMatrix BPM", Retrieved at <<http://www.tibco.com/products/bpm/bpm-enterprise/activematrix-bpm/default.jsp>>, Retrieved Date: Apr. 5, 2011, p. 1.
Martikainen, et al., "OVOPS, Object Virtual Operations System for Distributed Applications Development", Retrieved at <<http://www2.it.lut.fi/project/ovops/docs/p_ovops_dist.ps>>, Proceedings of the IFIP TC6 International Conference on Information Networks and Data Communication, 1994, pp. 13.
Neumann, et al., "Workflow-Integrated ERP: An Architecture Model for Optimized Coordination of Intra- and Interorganizational Production Planning and Control", Retrieved at <<http://csrc.lse.ac.uk/asp/aspecis/20020139.pdf>>, Jun. 6-8, 2002, pp. 991-1004.
McCall, et al., "Supporting Communication of Heterogeneous Distributed Agents with Agenda Management Systems", Retrieved at <<http://laser.cs.umass.edu/techreports/00-32.pdf>>, Retrieved Date: Apr. 5, 2011, pp. 42.

(Continued)

*Primary Examiner* — Kenneth Tang
(74) *Attorney, Agent, or Firm* — Kate Drakos; David Andrews; Micky Minhas (57) ABSTRACT

A system for organizing messages related to tasks in a distributed application is disclosed. The system includes a work-list creator to create a work list of the top-level work items to be accomplished in performing a task. Work-item processors are distributed in the system. The work-item processors process the top-level work item included in a task and also append additional work items to the work list. A work-list scheduler invokes the work-item processors so local work-item processors are invoked prior to remote work-item processors.

20 Claims, 4 Drawing Sheets

(56) References Cited

OTHER PUBLICATIONS

Wolf, et al., "Job Admission and Resource Allocation in Distributed Streaming Systems", Retrieved at <<http://www.cs.huji.ac.il/~feit/parsched/jsspp09/p10-wolf.pdf>>, Conference on Job Scheduling Strategies for Parallel Processing, Retrieved Date: Apr. 5, 2011, pp. 1-21.

Folino, et al., "An Autonomic Tool for Building Self-Organizing Grid-enabled Applications", Retrieved at <<http://staff.icar.cnr.it/folino/papers/fgcs07.pdf>>, Future Generation Computer Systems, vol. 23, No. 5, Nov. 22, 2006, pp. 21.

* cited by examiner

WORK ITEM PROCESSING IN DISTRIBUTED APPLICATIONS

BACKGROUND

Distributed computing applications are often deployed into environments having a multitude of different technologies and services that are used to form building blocks of the applications. Examples of distributed applications are legion and can include enterprise applications such as line of business or LOB, billing systems, customer relationship management or CRM, enterprise resource planning or ERP, business intelligence, human resource management, manufacturing, inventory control applications, and others. Additionally, applications that have historically been limited desk top applications are now being configured to work as distributed applications to leverage the additional resources in cloud systems and the like. Such applications include components that are typically distributed across tiers in a computer network. Also, some applications are intended to run in a cloud computing environment, others are intended to run on the premises of the entity or user, and others are intended to span these environments. Further, the environment may change as an application evolves, the number of users change, or the locations of the users become dispersed.

A distributed application is typically comprised of a set of distinct components, spread across tiers, which interact to perform work. While the components are virtualized, the relationship between the components is not. A physical wiring of components during runtime interaction is typically statically determined or otherwise hard-coded in this framework, which can place limits on the ways in which the application can be scaled or even on the application's overall ability to scale. While working with such models, many developers try to avoid writing stateful components because they are difficult to scale, but in making this choice the developer sacrifices benefits of other approaches, such as the natural expression of application logic.

One desirable characteristic of a distributed application is its ability to scale, or to cost-effectively change with the enterprise or user demand for services of the application. Typical object-based marshaling systems, however, can become inefficient when used in applications where distinctions between layers are blurred or are used on high latency networks such as the Internet and others, which can make scaling such systems difficult and introduce other issues.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure is directed to a system for organizing messages related to complex distributed tasks in a distributed application to overcome the network inefficiencies of current messaging systems. Each complex distributed task includes one or more top-level work items that are to be performed to complete the task. The top-level work items can each include one or more additional work items that may be developed from the top level work items. The additional work items can also develop still additional work items. The work items are to be completed in order to complete the task. The system provides for improved network performance of distributed application.

The system includes a work-list creator to create a work list of the top-level work items to be accomplished in performing a task of the distributed application. A work list is a collection of work items. A work item is a request to perform a calculation and includes information used to identify the code that can perform the operation. For example, a work item to add 1 and 2 together might be represented as {workitem Type: 'Add', Arg1:1, Arg2:2}. Work-item processors are distributed in the system. The work-item processors are configured to process the work item included in a task and also configured to append additional work items to the work list. A work-list scheduler is configured to invoke the work-item processors in a manner such that local work-item processors are invoked prior to remote work-item processors.

In one example, the application generates the work list and local work-list scheduler. The local work-list scheduler makes use of local work item processors to initially perform the work items. In circumstances where the work items cannot be completed locally, the local work-list scheduler is communicably coupled to a remote work-list scheduler over a computer network. The remote work-list scheduler makes use of remote work item processor for perform remote work items at the remote site. Results from the remote work-item processors are returned to the remote work-list scheduler, which returns the results to the local work-list scheduler. The results can be provided to the local work-item processors, and those results can be returned to the work-list scheduler. The work-list scheduler returns the results to the application.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
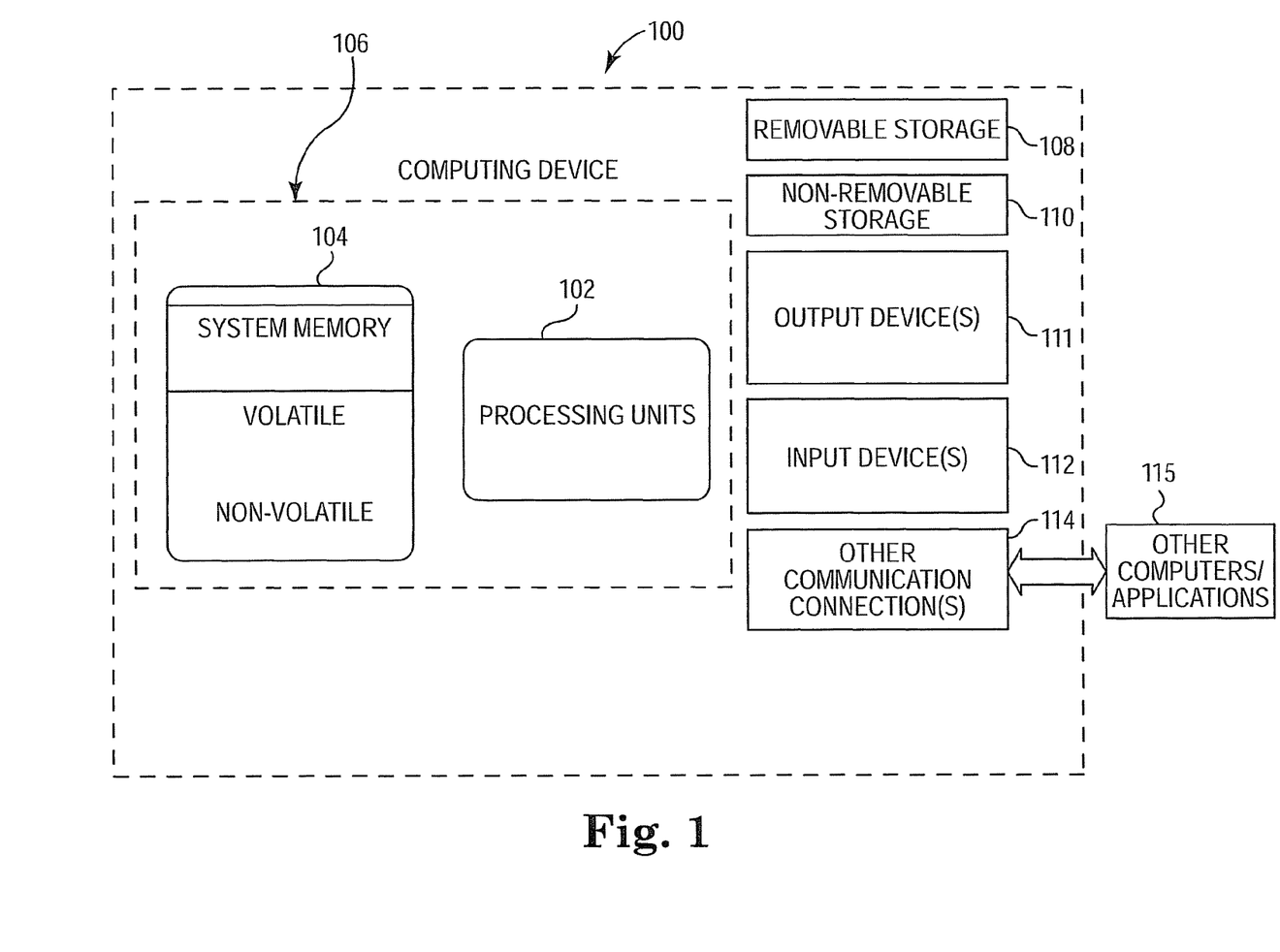
FIG. 1 is a block diagram illustrating an example computing device for running, hosting, or developing an object marshaling system.

FIG. 1 illustrates an exemplary computer system that can be employed in an operating environment such as a distributed computing system or other form of computer network and used to host or run a distributed application included on one or more computer readable storage mediums storing computer executable instructions for controlling a computing device or distributed computing system to perform a method. The computer system can also be used to develop the distributed application and/or provide a serialized description or visualized rendering of the application.

The exemplary computer system includes a computing device, such as computing device 100. In a basic configuration, computing device 100 typically includes a processor system having one or more processing units, i.e., processors 102, and memory 104. Depending on the configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. An example communication connection can be an Ethernet interface. In some examples, the computing device can also have one or more additional processors or specialized processors (not shown) to perform processing functions offloaded from the processor 102. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. Typically, the managed environment includes pre-coded solutions to common programming problems to aid software developers to create applications, such as software programs, to run in the managed environment. An example of a managed environment can include an application framework sold under the trade designation .NET Framework available from Microsoft, Inc. of Redmond, Wash. U.S.A.

The computing device 100 can be coupled to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Figure 2:
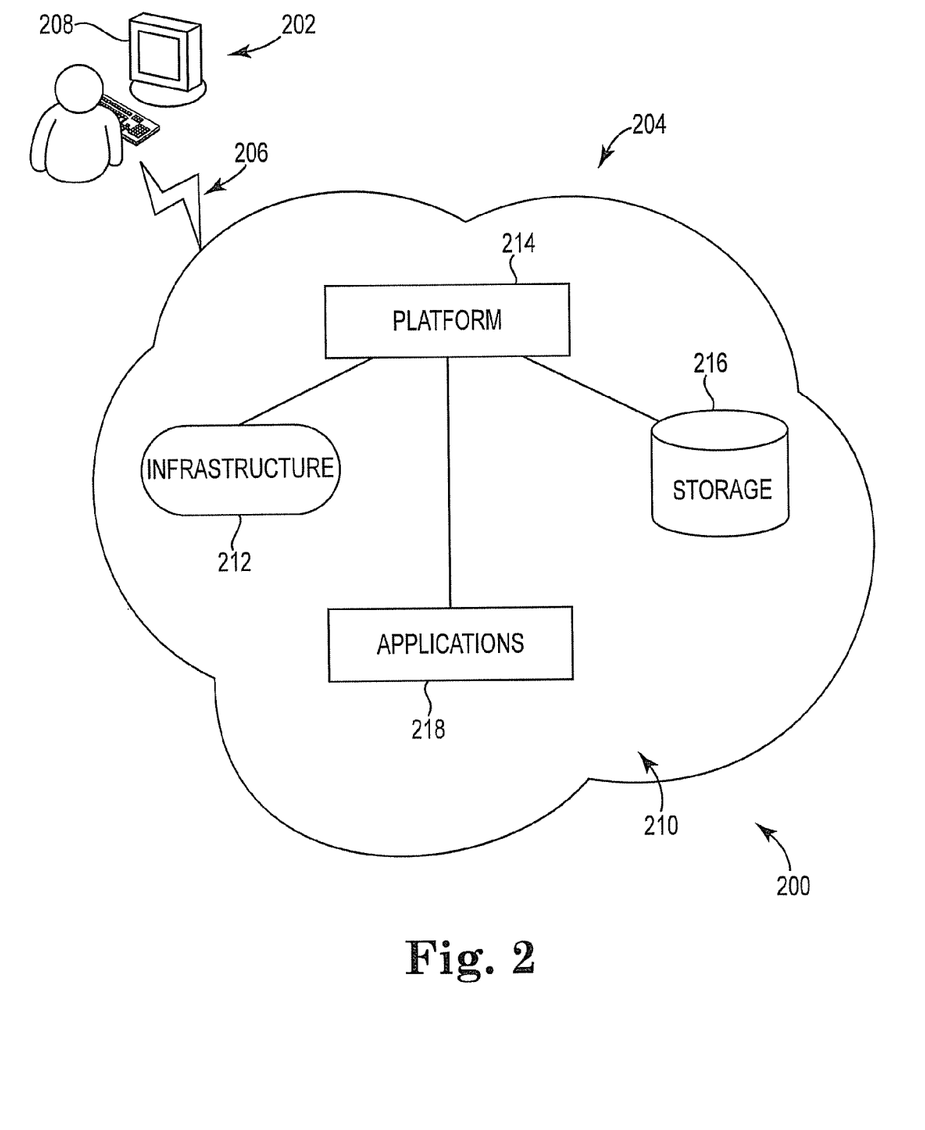
FIG. 2 is a schematic diagram illustrating an example of a computer network including a computing device of FIG. 1 interconnected with other computing devices.

FIG. 2 is a schematic diagram illustrating one example of a computer network, which is often referred to as cloud computing system 200. Typically, the cloud computing system 200 includes a front end 202, often referred to as client, and a back end 204, often referred to as the cloud. The front end 202 and the back end 204 are coupled together through a network 206, such as the Internet. The front end 202 and back end 204 can also be located on premises or limited to a particular enterprise. In still another example, the environment can include both on premises and off premises components. The front end 202 includes client devices 208 that can be constructed in accordance with computing device 100 in one example. Each of the client devices 208 includes an application (not shown) running on the client device 208 to permit access the cloud computing system 200. In one example, the application can be a general-purpose web browser or the application can be a particular application having availability limited to clients of a particular cloud system. The back end 204 includes computing devices including servers and data storage systems coupled together to create the cloud portion of computing services.

In one example, a cloud architecture 210 includes an infrastructure 212, an application platform 214 (such as a Platform-as-a-Service), storage 216, and applications 218, coupled together to permit the client to access systems and information with out having to purchase or maintain the underlying software and hardware used to perform the services of the back end 204. Most cloud computing infrastructures include services delivered through common centers and built on servers. The application platform 214 allows applications to be hosted and run at one or more typically remote datacenters. In one example, the datacenters can themselves include forms of distributed computing such as computing clusters and storage. The application platform 214 can also provide a cloud operating system that serves as a runtime for the applications and provides a set of services that allows development, management and hosting of distributed applications off-premises.

Services and applications 218 built using the platform 214 or for the platform 214 can run on top of the operating system. Generally, the operating system can include three components including compute, storage, and host. Compute provides a computation environment, and storage provides scalable storage, such as tables, queue, and so on, for large scale needs. The host environment can pool individual systems into a network for managing resources, load balancing, other services for the applications, and the like without using the hosted applications 218 to explicitly perform those functions. In one example, the cloud system can host a integrated development environment, such as one sold under the trade designation of Visual Studio available from Microsoft, Inc., where high computational and data intensive functions such as code debugging can be off loaded to one or more computing devices or clusters in the back end 204.

The cloud computing system 200 is one example suitable for object marshaling. In this example, object marshaling can be applied within implementations of different marshaling, remoting, or remote procedure call mechanisms or systems, which transport data between computing resources in the cloud computing system 200, processes or instances of computer programs, and/or threads. The present disclosure improves the performance for complex distributed applications where processing occurs on multiple computers, where the latency between these computers can be significant, and where the communications between computers is complicated. Historically, there have been three ways to implement this communication including standard synchronous messaging, standard asynchronous messaging, and complex messaging.

Synchronous messaging can provide only a naïve solution. For example, if a processing component requests information from a resource in order for the processing component to complete its task, the processing component will send a message to the resource and block the thread of the processing component until the resource responds to the message. In complicated communications between computing devices, the synchronous approach typically results in unacceptably poor performance in environments with high network latency such as the Internet. After each message is sent, the sender will block waiting on a response before continuing processing. At which point, there will soon be another network request, and another relatively long wait for a response.

Asynchronous messaging allows the application to continue processing after sending a request message while the application waits for the response. An application processing thousands of items in a list can quickly send thousands of message requests to target computers. The asynchronous approach provides performance benefits over the synchronous approach, but it does include drawbacks. An example drawback of asynchronous messaging is that sending many message requests over the network, such as thousands of small message requests, can be inefficient because of the overhead cost of each message request. To address this, implementations can use an approach such as a Nagle algorithm where messages are delayed to try to combine them together. Delaying and combining algorithms, however, can reduce application responsiveness particularly if other parts of the application partially use synchronous communication. Another drawback of asynchronous communication involves non-determinism in the application because each of the message requests was issued an independent request, which can make difficult the finding and diagnosing of bugs.

Complex messaging, at the application level, attempts to build a large complicated message instead of sending the large number of independent messages. In the above example of an application processing thousands of items in a list, complex messaging could send a single request containing information from all the items in the list. Some drawbacks of complex messaging can involve having to contort the logic of the application in ways that are undesirable and can result in network message formats that are difficult to change. For example, some of the items could be of a first class, and other items could be of a second class. The different classes will work together with additional steps involving a common way to add their requests to the network message and a common way for finishing the processing after the response.

Figure 3:
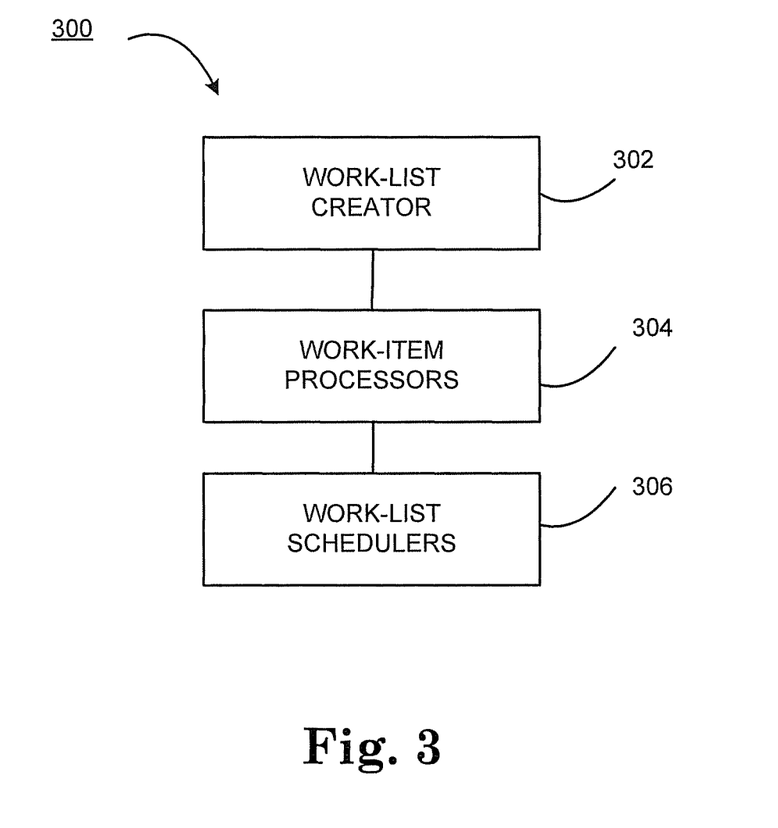
FIG. 3 is a block diagram illustrating an example of a system to organize work items in a distributed application on the computer network of FIG. 2.

FIG. 3 illustrates a system 300 for organizing messages related to complex distributed tasks in a distributed application to overcome the network inefficiencies above the messaging systems described above. The system 300 includes a work-list creator 302 to create a work list (not shown) of top-level work items to be accomplished in performing a task of the distributed application. Work-item processors 304 are distributed in the system 300. The work-item processors 304 are configured to process the top-level work item included in a task and also configured to append additional work items to the work list. The additional work items can be developed from processing the top-level work items and the additional work items. A work-list scheduler 306 is configured to invoke the work-item processors 304 in a manner such that local work-item processors are invoked prior to remote work-item processors.

The work list, in one example, is an object that can be used to tie together the work items of a task and can include additional work items, which can be work items developed from work items. Work items are appended to the work list through methods. If the work item is expected to include an output result, the caller can provide a means to obtain that from the work list. For example, the caller can provide a call back routine/delegate, or the caller could receive another object that it could query to obtain the result.

The work-list scheduler 306 can be a layer in system 300 to create and manage the work list and to coordinate the execution of the work items on the work list. The work-list scheduler 306 is capable of finding a distributed component to processes a particular work item, and it is capable of determining an appropriate work-item processor 304 for the particular work item. Further, the work-list scheduler 306 is capable of interacting with a remoting system employed by the application to send work items from the computing device where the request was appended to one of the other computing devices used in the distributed application. In one example, the work-list scheduler 306 can send these work items linked together into a single remoting message.

An operation can be started with the work-list creator 302 such as the edge of the application, i.e., the part of the application that directly interacts with some external actor such as the operating system. For example, a user interface layer could include features to start the work-list. The work-list creator 302 generates the work list object, appends the initial work items to the work list, and, after all the top-level work items are added, initiates the work-list scheduler 306 to begin executing. To execute the work list, the work-list scheduler 306 begins by calling into any work-item processor 304 which can be run locally, such as on the current computing device, and does not invoke a network request.

Work item processors 304 can be synchronous or asynchronous. Asynchronous processors are typically employed when the processing of the work item may use the help of another distributed component, such as on a different computing device. Asynchronous processors receive a reference to the executing work list, so that the processors can add new work items to the work list as part of the execution. Asynchronous processors are able to add new work items to the work list in two stages including when the processors are first given the work item to start executing and as previous work items that they appended complete. The processors can increase efficiency by appending work items quickly after receiving the work item, such as appending requests for the information in the first stage. In one example, the work-list scheduler 306 can be configured to take the output of one work item and turn it into input for a subsequent work time. In another example the work-list scheduler may be only able to support this feature in just trivial cases. In the latter example, work items are designed so as independent from each other that the total result may be calculated within a small number of waves. One approach to having the scheduler 306 understand when the first phase of processing is complete is to configure asynchronous work item processors to they append additional work items before returning from the function that initially gives them the work item.

Synchronous work item processors work well in situations where the processing of the work item can be done without making additional requests over the network. Synchronous processors can simplify the implementation of the various work item processors 304 because algorithms are generally easier to implement in a synchronous manner than in an asynchronous manner.

After the locally processed work items processed have executed as far as they can, the work-list scheduler 306 will send any remaining work items to the other computing devices in the distributed application. At this point, work items that are processed synchronously will typically be complete. For work items that are processed asynchronously, at least the first phase of execution is complete. If the application is distributed over multiple tiers instead of client-server, the work-list scheduler 306 can separate work items based on which tier will execute the work items and send the work items to the corresponding tier.

Each tier will also include a work-list scheduler 306 on the remote computing devices to receive the work items from a network layer. Like on the local computing device, the remote work-list schedulers execute all the work items that it can on the computing where it is running before sending information over the network. Depending on the network architecture supported by the distributed application, this might include sending requests to a peer computing device, sending the response back to the source computing device, or sending callback requests back to the source computing device.

In this manner, execution of the work list can move back and forth between the computing devices participating in the distributed application until the original operation is complete. Efficient use of the system 300, however, strives to complete the tasks within a concise number of round trips.

Figure 4:
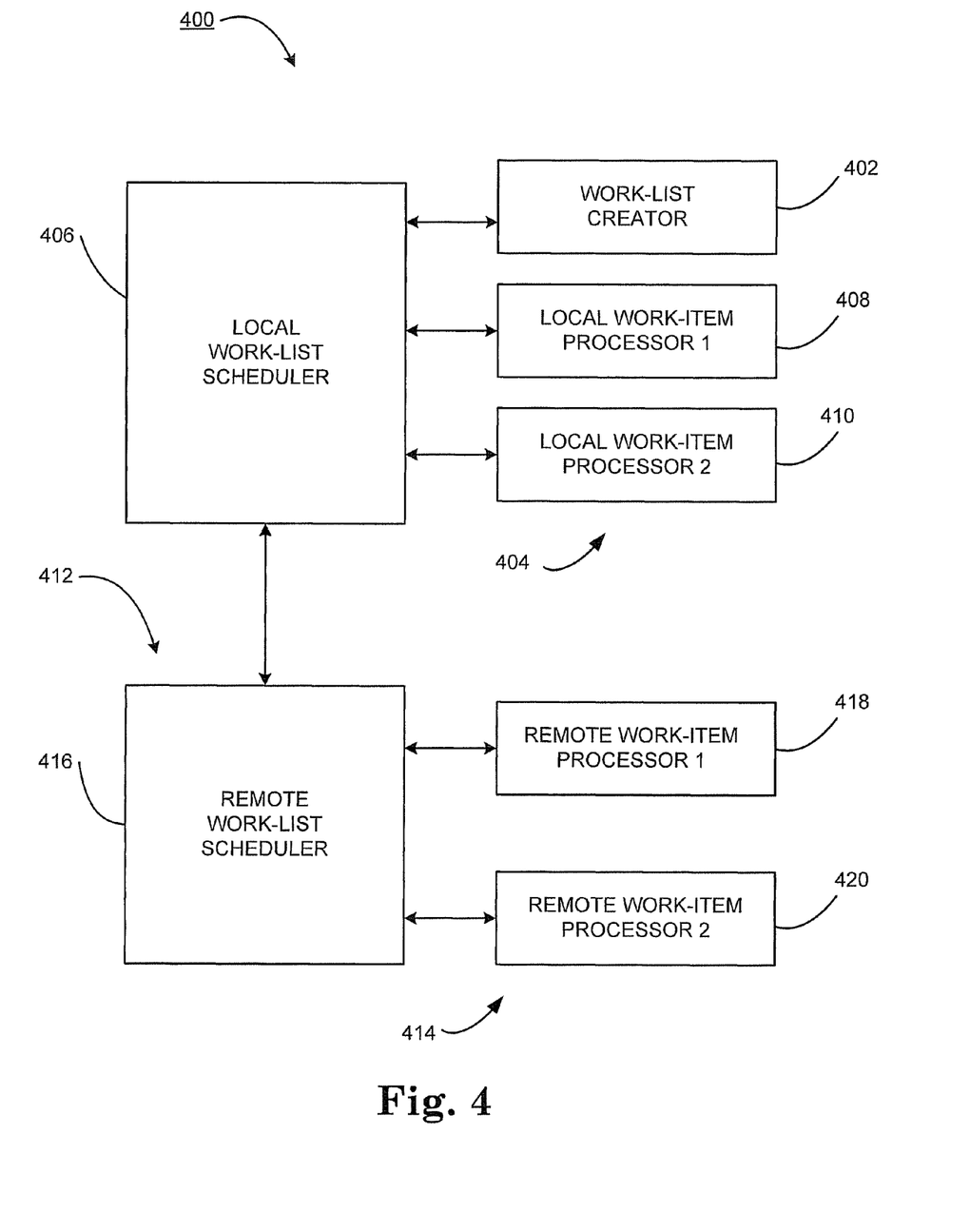
FIG. 4 is a block diagram illustrating an example system of the system of FIG. 3.

FIG. 4 illustrates an example system 400 constructed in accordance with system 300 described above. System 400 includes a work-list creator 402, a set of local work-item processors 404, and a local work-list scheduler 406. In the example, the local work-item processors 404 include a local synchronous processor 408 and a local asynchronous processor 410. In a remote tier 412, the system 400 also includes remote work-item processors 414 and a remote work-list scheduler 416. The remote work-item processors 414 can include a first remote processor 418 and a second remote processor 420.

In the example system 400, the work-list creator 402 will generate the work-list scheduler 406 and append a first and second work item that are part of a distributed application task. The first work item can be provided to the first local work-item processor 408 for synchronous processing, in this example, which returns a result back to the work-list scheduler 406. The second work item can be provided to the second local work-item processor 410 for asynchronous processing. Before the second local work-item processor can return a result, however, it appends third, fourth and fifth work items (additional work items) to the local work-list scheduler 406 for processing on a remote tier 412.

A network request is sent from the local work-list scheduler 406 to the remote work-list scheduler 416 including the third, fourth, and fifth work items. The third work item can be provided to the first remote processor 418, which returns a result to the remote work-list scheduler 416, and the fourth and fifth work items can be provided to the second remote processor 420, which returns a result for each work item. The remote work-list scheduler 416 then provides a network reply to the local work-list scheduler 406. The local work-list processor can then provide the results to the second local processor 410, which has been waiting for the results to complete the second work item. The second local work-item processor 410 returns the result of the second work item. The results of the first work item and the second work item are returned to the work list creator 402.

As an example, system 300 can be applied to a cloud-hosted debugger of an integrated development environment or IDE, such as the one sold under the trade designation of Visual Studio. When the debugger enters break state after, for example, hitting a breakpoint, the open debugger windows are updated. Once the debugger user interface is notified that the breakpoint has been hit, and after the debugger has completed any immediate updates (such as moving the cursor to the file/line of the hit breakpoint), the debugger will update all the other debugger windows. Work lists can be used to make that these updates happen efficiently when the application is executing on remote computing devices.

The debugger user interface creates the work list object and in this example is the work-list creator 302. The watch window might pass along the set of expressions that it currently has, along with their expansion states, and information about which items are visible (such as row number of the first visible row and the number of rows that can be displayed in the window). The threads window might iterate over every thread, and append a work item to obtain current information for that thread (such as thread name, current location, and other information). Other windows would add requests in a similar manner. Once the windows have had a chance to append their work items, the work-list scheduler 306 begins to execute the work list items on local work-item processors 304.

The work-list scheduler 306 could call to an expression evaluator, i.e., the part of the debugger that understands programming language text, and requests evaluation of the various expressions from the watch window. The expression evaluator could processes the 'watch window refresh' work item asynchronously—at the first stage of evaluation, it could append new requests to the work list that read data from the remote work-item processors 304. The requests would not start executing until the work list has finished all the work items that can be completed on the local computing device. Once this processing is complete, however, the work items will be sent to the remote computing devices. When the results eventually come back, the expression evaluator will be able to complete its work item and mark it as complete, passing back the new watch window data to the debugger user interface.

The work-list scheduler 306 could also call to a class that handles providing information about threads in the target process. In this example there is a different work item to refresh each thread, so this class could be invoked repeatedly. The thread class could handle the processing of the work item asynchronously, as, at least in some execution environments, walking a call stack is an operation that works on both the remote computing device and the local IDE computing device, and the threads class acquires access to the call stack to return the current location. A request is appended to walk the first frame of the call stack to the work list when the threads class is initially called. It would then return, and it would run again after that frame is unwound. In one example, the threads class will walk through any 'wait' frames, so when the thread class obtains this frame, if the frame is that of a wait operation, it could append a new work item to the work list to unwind the next frame. In this way the cycle could repeat several times to either find a good current location, or to give up and return the initial location. Because work lists are being used, this operation is likely to happen in waves where the thread class is called many times, this results in many new work items, then many results come back on the next reply message, and then the process may repeat a few times before finally getting the result for all threads.

The work list scheduler 306, such as a remote work list scheduler 416 in system 400, could invoke remote work-item processors 414 in a synchronous manor. For example, for execution environments where call stacks can be walked without access to a symbol file (such as a PDB file), because the data used for walking the stack is kept inside the target process (such as PDATA on such systems available under the trade designation Windows x64 from Microsoft, Inc., or data structures maintained by a just-in-time compiler such as in managed environments available under the trade designation of .NET Framework also from Microsoft, Inc.) The call stack unwinder could be invoked in a synchronous manner. The unwinder would interact with the remote process in order to walk the stack, and then build up a data structure to describe the walked stack frames. For example, the unwinder might give then instruction of each stack frame, and keep the original register values of that frame.

In one example, a more maintainable system can include the portion of work-list scheduler 306 that handles individual work items be created by a code generator or be implemented in a table-driven manner so that new types of work items may be added to the work list without modifying the work-list scheduler 306 itself. One implementation option could be to have the loading of work-item processors 304 be done as an extensibility hook, so that new work-item processors 304 can be added to the system 300 without touching the work=list scheduler 306 or other parts of the application.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system of performing tasks of debugging in a distributed application, the system comprising:
   a work-list creator to create a work-list of top level work items to be accomplished during break points in performing a debugging task, the top level work items originate from the work-list creator at a user interface of the distributed application that interacts with an external actor;
   a plurality of distributed work-item processors each configured to process the top level work items included in the task and also configured to append additional work items to the work-list, wherein the additional work-items are developed from processing top level work items and additional work-items; and
   a work-list scheduler configured to invoke the work-item processors including a local work-item processor local to the user interface and remote work-item processors remote from the local work item processor, wherein the local work-item processor is invoked to process the top level work items and the local work-item processor is invoked prior to remote work-item processors.

2. The system of claim 1 wherein the work list is an object.

3. The system of claim 1 wherein the work items are appended to the work list with methods.

4. The system of claim 1 wherein results of the work-item processors are retuned to the work-list scheduler and provided to the work-list creator.

5. The system of claim 1 wherein the work-list scheduler manages the work list and coordinates the execution of work items.

6. The system of claim 1 wherein the work-list scheduler includes a local work-list scheduler and a remote work-list scheduler.

7. The system of claim 6 wherein the local work-list scheduler and the remote work-list scheduler are coupled together over a computer network.

8. The system of claim 1 wherein the work-item processors include asynchronous processors and synchronous processors.

9. The system of claim 1 wherein the work-list creator is included at a portion of the application that directly interacts with an external actor.

10. The system of claim 9 wherein the external actor is an operating system.

11. A system of performing tasks of a distributed application over a network, the system comprising:
   a work-list creator to create a work list of top level work items to be accomplished in performing updates during a breakpoint of the distributed application, the top level work items originate from the work-list creator at a user interface portion of the distributed application that interacts with an external actor;
   a local work-item processor local to the work-list creator and configured to process a selected top level work item included in a task and also configured to append additional work items to the work list, wherein the additional work-items are developed from processing top level work items and additional work items;
   a local work-list scheduler configured to invoke the local work-item processor;
   a remote work-list scheduler coupled to the local work-list scheduler over a computer network; and
   a remote work-item processor, remote from the local work-item processor and configured to process work items from the remote work-list scheduler; and
   the local work-list scheduler is configured to invoke the local work-item processor to perform the work items prior to transferring work items to the remote work-list scheduler, the local work-item processor is invoked prior to the remote work-item processor.

12. The system of claim 11 wherein the local work-list scheduler is included in a first tier and the remote work-list scheduler is included in a second tier of a distributed network architecture.

13. The system of claim 12 wherein the first tier is a client tier.

14. The system of claim 11 wherein the local work-item processor is configured to append additional work items and results to the local work-list scheduler.

15. The system of claim 14 wherein the remote work-list scheduler is configured to receive results from the remote work-item processor and return the results to the local work-list scheduler.

16. The system of claim 15 wherein local work-list scheduler returns results from the work items to the work-list creator.

17. A system of performing tasks of debugging over a network, the system comprising:

a debugger user interface configured to create a work list of top level work items to be accomplished in performing windows updates during a breakpoint;

a local work-item processors local to the debugger user interface and configured to process a selected top level work item included in a task and also configured to append additional work items to the work list, wherein the additional work-items are developed from processing top level work items and additional work items, the top level work items originate from the work-list creator at the debugger user interface;

a local work-list scheduler configured to invoke the local work-item processors;

a remote work-list scheduler coupled to the local work-list scheduler over a computer network; and a remote work-item processor, remote from the local work-item processor and configured to process work items from the remote work-list scheduler;

the local work-list scheduler is configured to invoke the local work-item processors to perform the work items prior to transferring work items to the remote work-list scheduler; and the local work-item processors are invoked prior to remote work-item processors.

18. The system of claim 17 wherein portions of the local and remote work-list schedulers that handle individual work items are created by a code generator or are implemented in a table-driven manner such that new types of work items are added to the work list without modifying the local and the remote work-list schedulers.

19. The system of claim 17 wherein open debugger windows add work items to the work list.

20. The system of claim 17 wherein a call stack window adds a request to obtain the full call stack.

* * * * *